(12) United States Patent
Akutsu

(10) Patent No.: US 7,070,283 B2
(45) Date of Patent: Jul. 4, 2006

(54) PROJECTION APPARATUS, PROJECTION METHOD AND RECORDING MEDIUM RECORDING THE PROJECTION METHOD

(75) Inventor: Takashi Akutsu, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 10/913,984

(22) Filed: Aug. 5, 2004

(65) Prior Publication Data
US 2005/0046803 A1 Mar. 3, 2005

(30) Foreign Application Priority Data
Aug. 25, 2003 (JP) ............................. 2003-299887

(51) Int. Cl.
G03B 21/26 (2006.01)
G03B 21/16 (2006.01)
G03B 21/20 (2006.01)
G03B 3/00 (2006.01)
H04N 3/22 (2006.01)

(52) U.S. Cl. ............................. 353/69; 353/30; 353/52; 353/85; 353/101; 348/745; 352/140

(58) Field of Classification Search ................ 353/30, 353/69, 70, 101, 121, 52, 85; 348/745, 746, 348/806; 345/643, 647; 352/140
See application file for complete search history.

(56) References Cited
U.S. PATENT DOCUMENTS
6,416,186 B1 * 7/2002 Nakamura .................. 353/69
6,592,228 B1 * 7/2003 Kawashima et al. ........ 353/101
6,618,076 B1 9/2003 Sukthankar et al. ........ 348/180
6,753,907 B1 6/2004 Sukthankar et al. ..... 348/222.1
6,877,864 B1 * 4/2005 Tamura et al. ................ 353/70
6,886,946 B1 * 5/2005 Eguchi ....................... 353/101
2002/0021418 A1 2/2002 Raskar ......................... 348/36
2002/0051095 A1 5/2002 Su ............................. 348/745

FOREIGN PATENT DOCUMENTS

| JP | 8-9309 A | 1/1996 |
|---|---|---|
| JP | 2000-241874 A | 9/2000 |
| JP | 2003-29201 A | 1/2003 |
| JP | 2003-32579 A | 1/2003 |
| JP | 2003-204495 A | 7/2003 |
| WO | WO 01/47259 A1 | 6/2001 |
| WO | WO 01/47285 A1 | 6/2001 |

* cited by examiner

Primary Examiner—Melissa Jan Koval
(74) Attorney, Agent, or Firm—Frishauf, Holtz, Goodman & Chick, P.C.

(57) ABSTRACT

A projection apparatus comprising a projection section for projecting an image corresponding to an input image signal, a distance measuring section for measuring each distance of several positions on an image projection plane made by the projection section, a focus control section for making keystone correction on an image projected by the projection section so that a projection image is formed into a rectangular shape having a proper aspect ratio based on each distance obtained by the distance measuring section while controlling a focus position of the image projected by the projection section, and a control section for instructing to carry out processing by the focus control section.

10 Claims, 7 Drawing Sheets

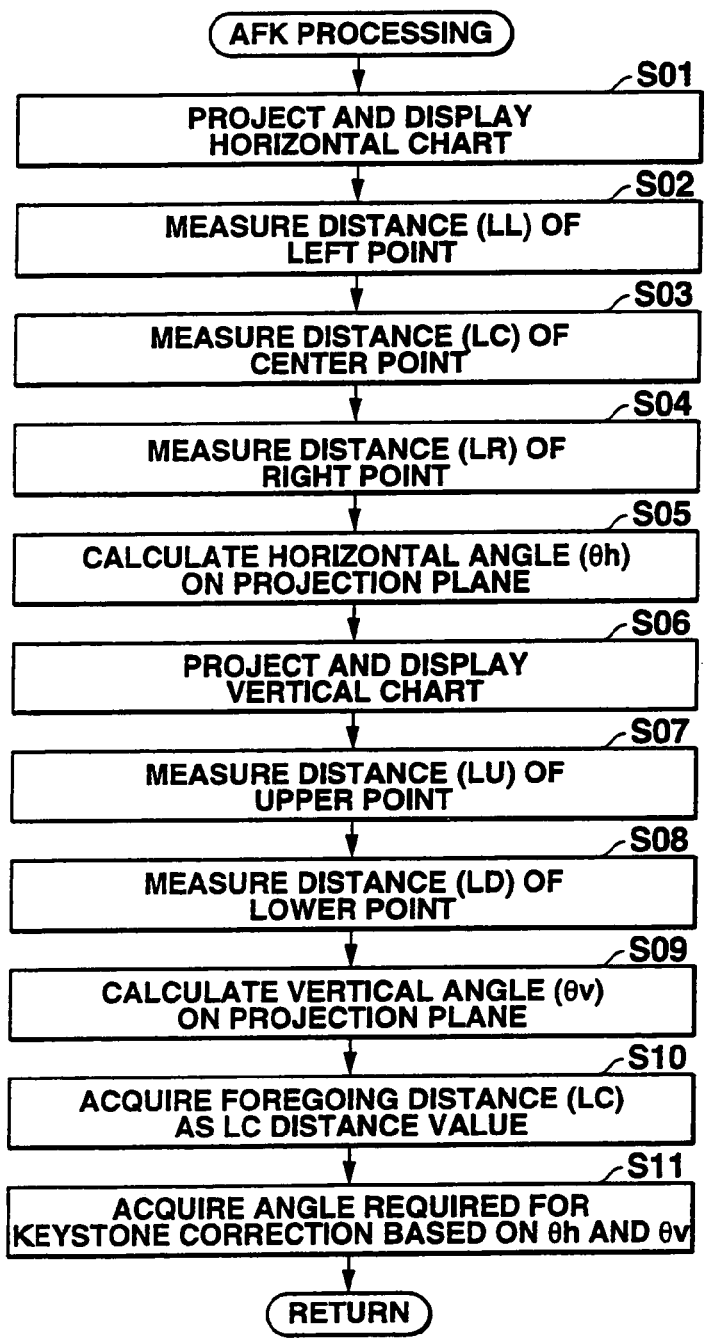
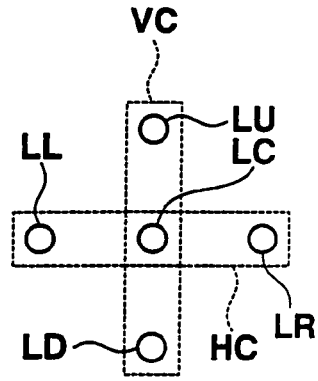
FIG.5B
FIG.5A

PROJECTION APPARATUS, PROJECTION METHOD AND RECORDING MEDIUM RECORDING THE PROJECTION METHOD

CROSS-REFERENCE TO RELATED APPLICATIONS

This application is based upon and claims the benefit of priority from prior Japanese Patent Application No. 2003-299887, filed Aug. 25, 2003, the entire contents of which are incorporated herein by reference.

BACKGROUND OF THE INVENTION

1. Field of the Invention

The present invention relates to an automatic projection apparatus having an automatic focusing function, a projection method, and a recording medium recording the projection method.

2. Description of the Related Art

Conventionally, a portable type projector has been disclosed in the following Patent Document 1, for example. The projector is provided with a monitor camera to monitor a projection screen, and thereby, automatically carrying out various controls required for image display.

[Patent Document 1]:

JPN. PAT. APPLN. KOKAI Publication No. 2000-241874

However, the portable type projector disclosed in the forgoing Patent document 1 has the problems described below. More specifically, the projector makes processings with respect to image data obtained by photography using a monitor camera. For this reason, the focusing operation and the operation of correcting keystone distortion are carried out independently from each other. As a result, time becomes inevitably long to calculate (or compute) the operations described above.

In addition, direction and angles of elevation and depression of a projection lens optical system must be varied to achieve the foregoing control operation. For this reason, the lens system structure having an optically "movement" mechanism is required. As a result, the whole of the projector is made into a large size, and becomes complicate.

BRIEF SUMMARY OF THE INVENTION

According to the present invention, there is provided a projection apparatus which includes: a projection section for projecting an image corresponding to an input image signal; a distance measuring section for measuring respective distances to several positions on an image projection plane made by the projection section; a keystone correction section for performing keystone correction on an image projected by the projection section so that the projected image is formed into a rectangular shape having a proper aspect ratio based on the distances obtained by the distance measuring section; a focus control section for controlling a focus position of the image projected by the projection section based on at least one distance obtained by the distance measuring section; and a control section for issuing an instruction to carry out processings by the distance measuring section, the keystone correction section and the focus control section.

According to one aspect of the present invention, moreover, a temperature sensing section is provided for sensing a temperature of a light source lamp of the projection section, and the control section automatically issues the instruction when the temperature sensing section detects that the temperature of the lame is more than a predetermined value after power of the apparatus is turned on.

According to another aspect of the present invention, the instruction is issued by the control section when it is determined that a predetermined period of time has elapsed after power of the apparatus is turned on.

And according to a further aspect of the present invention, a luminance sensing section is provided for sensing a luminance of a light source lamp of the projection section, and the instruction is issued by the control section when the luminance sensing section detects that the luminance of the lamp is more than a predetermined value after a power of the apparatus is turned on.

BRIEF DESCRIPTION OF THE SEVERAL VIEWS OF THE DRAWING

FIG. 5A is a flowchart to explain the procedure of a sub-routine of AFK processing according to the first embodiment;

FIG. 5B is a view showing a projection display state of a horizontal chart image in the procedure of FIG. 5;

DETAILED DESCRIPTION OF THE INVENTION (First Embodiment)

The first embodiment will be described below with reference to the accompanying drawings. Here, the present invention is applied to a projector.

Figure 1A:
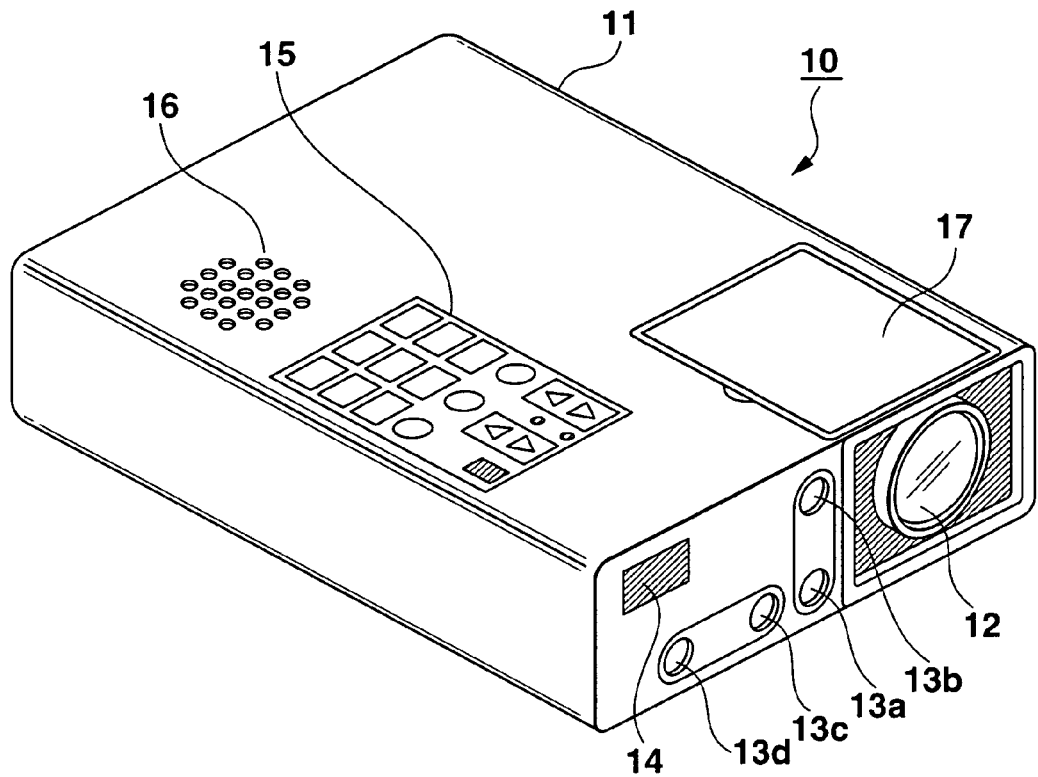
FIG. 1A is a perspective view showing the appearance of the front side of a projector according to a first embodiment of the present invention.

FIG. 1 shows the appearance of a projector 10 according to the first embodiment. As shown in FIG. 1A, a rectangular casing 11 is provided with projection lens 12, two pairs of focusing lenses 13a, 13b and 13c, 13d, and Ir (infrared) receiving section 14 at the front side.

The projection lens 12 is used for projecting an optical image formed by special optical modulator element such as micro-mirror element described later. Here, the projection lens 12 is capable of arbitrarily varying focal position and zoom position (projection angle).

The focusing lenses 13a to 13d function as part of a phase difference sensor 13. The focusing lenses measure a distance to the subject from their parallax with respect to a subject image based on the principle of triangulation, that is, to the projection image plane. The pair of focusing lens 13a and 13b measures a distance to the subject in the vertical direction. On the other hand, the pair of focusing lenses 13c and 13d measures a distance to the subject in the horizontal direction.

The Ir receiving section 14 receives infrared rays, which are overlapped with a key operation signal from a remote controller (not shown) of the projector 10.

The casing 11 is further provided with main key/indicator 15, speaker 16 and cover 17 at the upper surface.

The details of the main key/indicator 15 will be described later.

The speaker 16 acoustically outputs the sound when reproducing moving images.

The cover 17 is brought at open and closed positions when operating a sub-key (not shown). The sub-key is used to make various operations, which are not set and instructed by keys of the main/key indicator 15, without using the remote controller (not shown) of the projector.

Figure 1B:
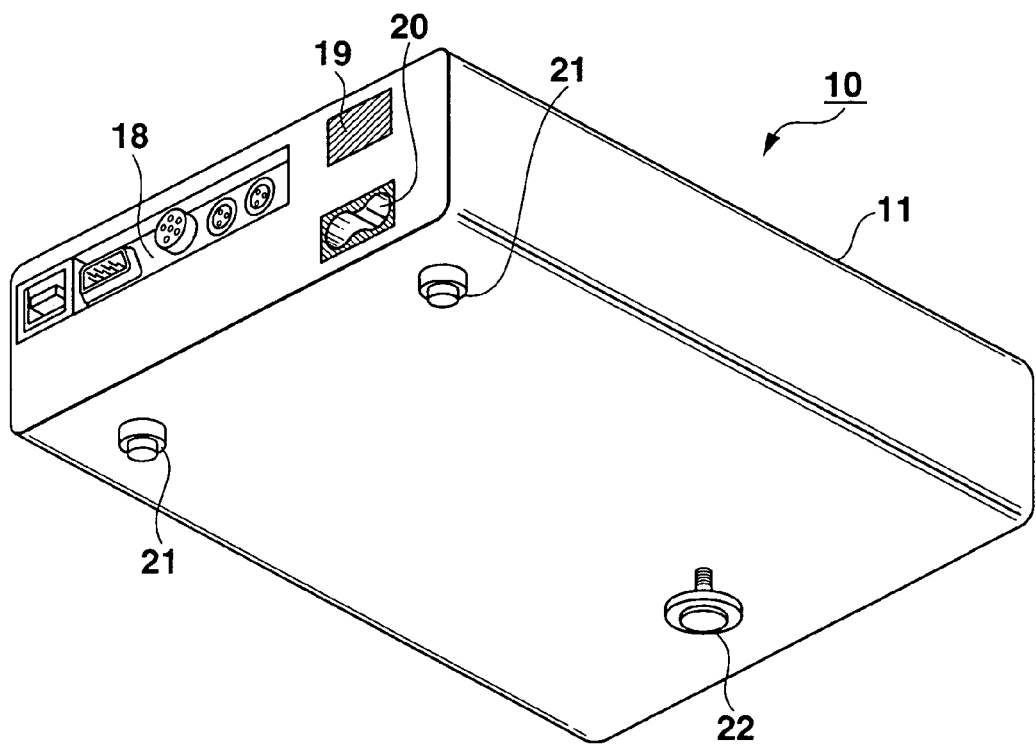
FIG. 1B is a perspective view showing the appearance of the rear side of the projector according to the first embodiment of the present invention.

As illustrated in FIG. 1B, the casing 11 is provided with input/output connector port 18, Ir receiving section 19 and AC adaptor connection port 20 at the rear side.

The input/output connector port 18 includes USB terminal for making connection with external device such as personal computer, video input mini D-SUB terminal, S terminal, RCA terminal and sound input stereo mini terminal.

The Ir receiving section 19 receives infrared rays, which are overlapped with a key operation signal from a remote controller (not shown) of the projector 10, like the foregoing Ir receiving section 14.

The AC adaptor connection port 20 is connected with a cable from a power source, that is, an AC adaptor (not shown).

In addition, the casing 11 is attached with a pair of fixed legs 21 at the lower surface on the rear side, and a height adjustable leg 22 at the same lower surface on the front side.

The screw of the adjustable leg 22 is operated by manual, and thereby, adjusts a projection vertical component of the projection lens 12, that is, depression angle.

The button arrangement of the main key/indicator 15 will be described below with reference to FIG. 2. More specifically, the main key/indicator 15 includes power source (power) key 15a, zoom (Zoom) key 15b, focus (Focus) key 15c, "AFK" key 15d, "Input" key 15e, and "Auto" key 15f. The main key/indicator 15 further includes various keys 15g to 15o such as "menu", "keystone", "HELP", "Esc", "↑" (up), "↓" (down), "←" (left), "→" (right) and "Enter". In addition, the main key/indicator 15 includes a power/standby indicator 15p and a temperature (TEMP) indicator 15q.

The "power" key 15a is used to instruct power on/off.

The "Zoom" key 15b is used to instruct zoom up (tele) and zoom down (wide) by operating buttons "Δ" and "∇".

The "Focus" key 15c is used to instruct movement to forward and backward directions of a focus position by operating buttons "Δ" and "∇".

The "AFK" key 15d (instruction section) instructs to immediately carry out automatic focus and automatic keystone correction.

The "Input" key 15e is used to instruct to manually change image signals inputted to any of the input/output connector port 18. The "Auto" key 15f is used to instruct to automatically change image signals inputted to any of the input/output connector port 18.

The "menu" key 15g is used to instruct to display various menu items relevant to the projection operation. The "Keystone" key 15h is used to instruct to make keystone correction by manual.

The "HELP" key 15i is used to display various help informations if users do not know the instruction operation. The "Esc" key 15j is used to instruct to cancel the operation at that time.

The "↑" (up), "↓" (down), "←" (left) and "→" (right) keys 15k, 15l, 15m and 15n are operated in accordance with the instructions to select or move menu items, manual keystone correction, pointer or cursor. Setup and changeover sections are composed of "menu" key 15g, "↑" (up) key 15k, "↓" (down) key 15l and "Enter" key 15o.

The "power/standby indicator 15p displays power on/off state and no input image signal state using light on/off or flash on/off of green and red LED.

The temperature (TEMP) indicator 15q displays whether or not a light source lamp of image projection reaches the temperature suitable to projection using light on/off or flash on/off of green and red LED.

Figure 3:
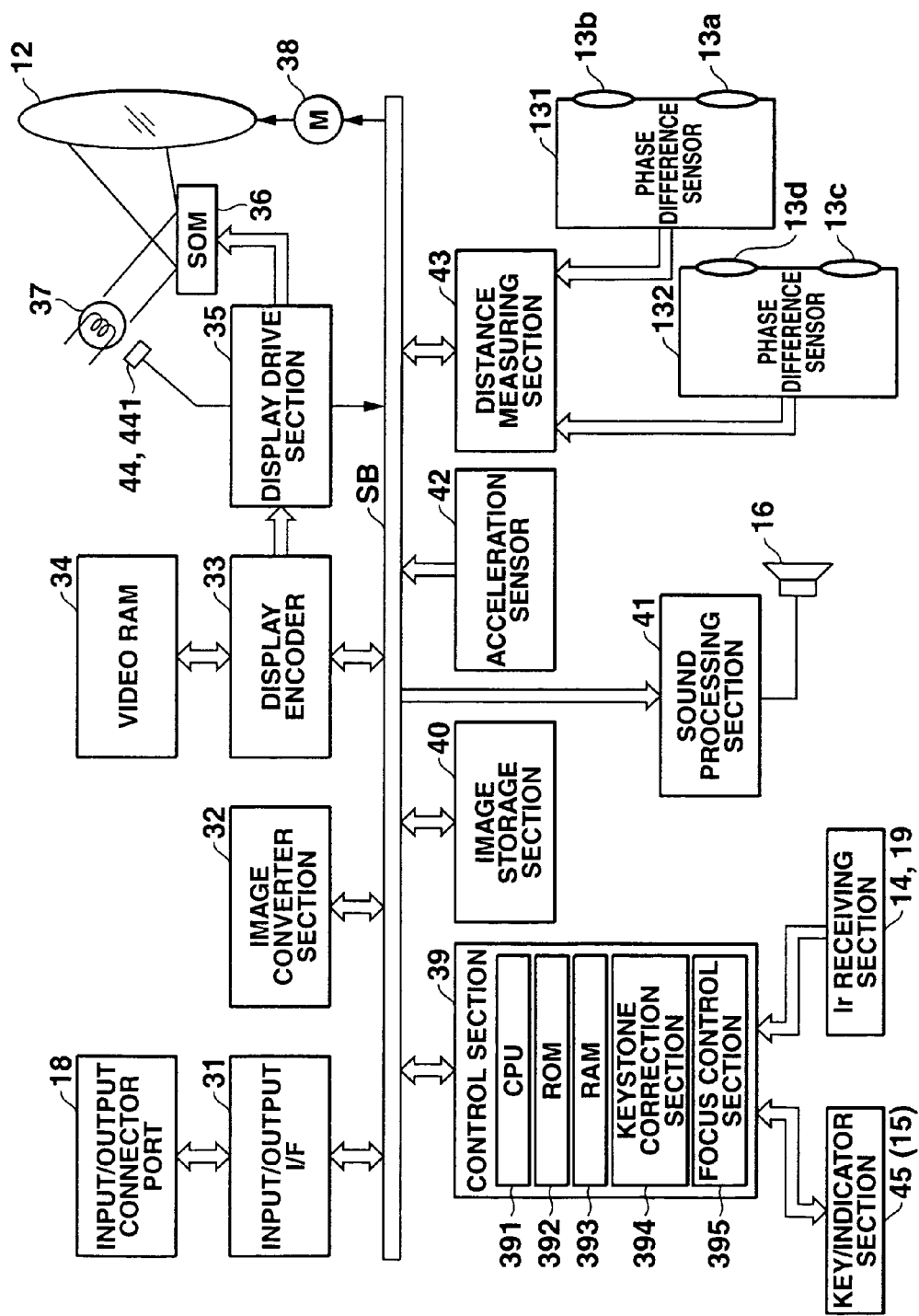
FIG. 3 is a block diagram showing the configuration of functional circuits included in the projector according to the first embodiment.

The functional configuration of electronic circuits included in the projector 10 will be explained below with reference to FIG. 3. In FIG. 3, various conformable image signals inputted from the input/output connector port 18 are converted (unified) into image signals having predetermined format in an image converter section 32. Thereafter, the image signals are sent to a display encoder 33.

The display encoder 33 encodes the sent image signal so that a video RAM 34 stores the image signal, and thereafter, generates a video signal from the image signal stored in the video RAM 34 and outputs the video signal to a display drive section 35.

The display drive section 35 drives a special optical modulator element (SOM) 36 at a proper frame rate corresponding to the sent image signal, for example, 30 [frame/second]. High-luminance white light emitted from a light source lamp 37 such as ultra-high pressure mercury-vapor lamp is irradiated to the special optical modulator element 36. By doing so, an optical image is formed by the reflection light reflected from the element 36, and thereafter, projected and displayed on a screen (not shown) via the projection lens 12.

A lens motor (M) 38 drives the projection lens 12 so that the projection lens 12 is properly moved to zoom and focus positions. Incidentally, a projection section is composed of the foregoing display drive section 35, special optical modulator element 36, light source lamp 37, projection lens 12 and lens motor (M) 38.

A control section 39 controls all operations of the circuits given above. The control section 39 is composed of CPU 391, ROM 392, RAM 393, keystone correction section 394 and focus control section 395. The ROM 392 fixedly stores various operation programs executed by the CPU 391. The RAM 393 is used as a work memory. The keystone correction section 394 makes keystone distortion correction of a projected image. The focus control section 395 controls the focus position of the projected image on the screen.

The control section 39 is further connected with image storage section 40, sound processing section 41, acceleration sensor 42, distance measuring section 43 and temperature sensor 44 via a system bus SB.

The image storage section 40 comprises a flash memory, for example, and stores image data such as chart image (horizontal and vertical chart images) and user logo image. The image storage section 40 properly reads image data instructed by the control section 39, and sends it to the display encoder 33 so that the image data is projected and displayed by the projection lens 12.

The sound processing section 41 includes a sound source circuit such as a PCM sound source. The sound processing section 41 converts sound data given in the projection display operation into an analog signal, and drives the speaker 16 to generate a sound.

The acceleration sensor 42 (movement sensing section) detects a vibration when the projector 10 is moved from the located state, and thereafter, outputs the detection signal to the control section 39.

The distance measuring processing section 43 (distance measuring section) drives the phase difference sensor 131 having focus lenses 13a and 13b and phase difference sensor 132 having focus lenses 13c and 13d to measure a distance to a position on an arbitrary point in a projected and displayed chart image described later.

The temperature sensor 44 (temperature sensing section) is arranged near the light source lamp 37 to detect a temperature when the light source lamp 37 emits light, and sends a temperature signal to the control section 39.

The main key/indicator 15 and the sub-key included in the cover 17 constitute a key/indicator section 45. A key operation signal generated from the key/indicator section 45 is directly inputted to the control section 39. The control section 39 drives the power/standby indicator 15p and the temperature indicator 15q so that they are directly lighting/flashing. An infrared light signal received by the Ir receiving sections 14 and 19 is directly inputted to the control section 39.

The operation of the first embodiment will be described below.

Figure 4:
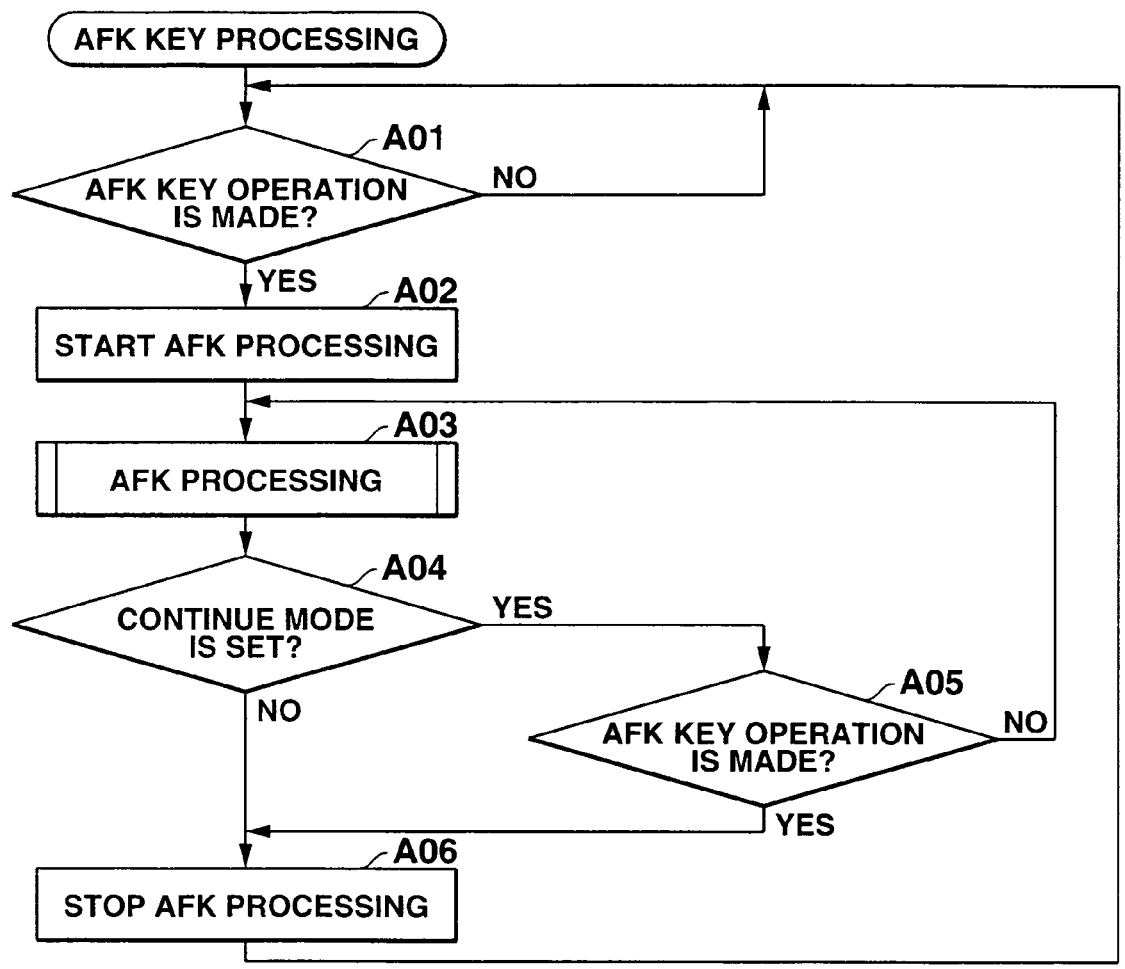
FIG. 4 is a flowchart to explain the procedure of an AFK key operation according the first embodiment.

FIG. 4 is a flowchart showing the procedure of automatic focus and automatic keystone correction. The procedure is taken as an interrupt processing, which is forcedly carried out by operating the "AFK" key 15d on the main key/indicator 15 in a power-on state. In this case, the control section 39 controls the procedure based on operation programs stored in the internal ROM 392.

In the first embodiment, two modes described below are given. One is a one-shot mode for carrying out automatic focus and automatic keystone correction only one time by the operation of the "AFK" key 15d. Another is a continue mode for continuously repeating the automatic focus and automatic keystone correction until the second time operation of the "AFK" key 15d is made after the first time operation of the "AFK" key 15d is made. In this case, the user arbitrarily presets either of the one-shot mode or continue mode by operating "menu" key 15g, "↑" (up) key 15k, "↓" (down) key 15l and "Enter" key 15o on the main key/indicator 15.

The initial stage of the procedure is a waiting state whether or not the operation of the "AFK" key 15d is made (step A01). When it is determined that the operation of the "AFK" key 15d is made, the operation made so far is interrupted. Thereafter, the start of the automatic focus and keystone correction is set as the interrupt processing (step A02). The first time automatic focus and keystone correction are carried out (step A03).

FIG. 5A is a sub-routine showing the procedure of the automatic focus and keystone correction. First, a horizontal chart image HC shown in FIG. 5B is projected and displayed by the projection system including the projection lens 12 based on image data stored in the image storage section 40 (step S01).

The horizontal chart image HC is composed of three point images horizontally arrayed at equal intervals.

In a state that the horizontal chart image HC is projected and displayed, the phase difference sensor 132 and the distance measuring section 43 measure a distance "LL" to projection image position of the point situated on the opposite left side of the projector 10 (step S02).

Thereafter, a distance "LC" to projection image position of the center point and a distance "LR" projection image position of the point situated on the right side are successively measured in the same manner as above (step S03, step S04).

Based on individual distances relevant to three points thus obtained, a horizontal angle "θh" on a screen projection plane for projecting image to the projection optical axis is calculated (step S05).

In place of the horizontal chart image HC, a vertical chart image VC shown in FIG. 5B is projected and displayed based on image data stored in the image storage section 40 (step S06).

The vertical chart image VC is composed of three point images vertically arrayed at equal intervals. In this case, the center point of the vertical chart image VC is positioned to overlap with the center point of the horizontal chart image HC.

In a state that the vertical chart image VC is projected and displayed, the phase difference sensor 131 and the distance measuring section 43 measure a distance "LU" to projection image position of the point situated on the upper side (step S07).

Thereafter, a distance "LD" to projection image position of the point situated on the lower side is measured in the same manner as above (step S08). In this case, a distance "LC" to projection image position of the center point is the same as the horizontal chart image HC. The distance is already measured in step S02; therefore, the measured value is employed here while the measuring process is omitted.

Based on individual distances relevant to three points of the vertical chart image VC, a vertical angle "θv" on a screen projection plane projecting image to the projection optical axis is calculated (step S09).

The distance "LC" to projection image position of the center point measured in step S02 is intactly required as a typical distance value of projection image (step S10). The lens motor 38 drives the projection lens 12 so that the projection lens 12 is moved to a new focus position corresponding to the distance value described above.

Thereafter, an angle required for keystone correction is calculated based on horizontal and vertical angles "θh" and "θv" on the screen projection plane projecting image obtained in steps S05 and S09 (step S11). By doing so, direction and angle where the screen projection plane is positioned can be seen. Further, it is possible to obtain a rectangle having a proper aspect ratio identical to the image signal including projection image data. The display encoder 33 is set to correct a ratio of top and bottom sides and a ratio of right and left sides in image data stored in the video RAM 34. Then, the sub-routine shown in FIG. 5A temporarily ends, and thereafter, the procedure returns to the AFK processing of FIG. 4.

In FIG. 4, automatic focus and keystone correction are carried out in step A03, and thereafter, it is determined whether the continue mode is set at that time (step A04).

If it is determined that the continue mode is set, it is confirmed that the second-time "AFK" key 15d is not operated (step A05). Then, the procedure returns to step A03 to carry out automatic focus and keystone correction again.

In a state that the continue mode is set, the procedures of the foregoing steps A03 to A05 are repeatedly carried out until the second-time "AFK" key 15d is operated.

If it is determined in step A05 that the second-time "AFK" key 15d is operated, and if it is determined in step A04 that one-shot mode is set, and not continue mode, automatic focus and keystone correction of interrupt processing are stopped (step A06). Thereafter, the operation come back to the normal operation, and the procedure returns to step A01 in preparation for a new operation of the "AFK" key 15d.

As described above, when the user operates the "AFK" key 15d on the main key/indicator 15, the procedure has instantly required for focus and keystone correction in response to the key operation. The procedure is to measure distances to several point positions corresponding to vertical and horizontal directions on the image projection plane. Based on the measured result, automatic focus and keystone correction on the projection image are carried out. Thus, the focus position of the projection image and the keystone distortion are simply and quickly adjustable automatically by one-time key operation.

In the first embodiment, either of one-shot mode or continue mode is preset, and thereby, either of the following selections is given. One is selection whether the foregoing automatic focus and keystone correction of the interrupt processing are carried out only one time by the operation of the "AFK" key 15d. Another is selection whether the automatic focus and keystone correction are continuously carried out until the operation of the "AFK" key 15d is again made. Thus, it is possible to select whether the operation is returned to the projection display so far, or shifted thereto after setting is carefully made in accordance with user's convenience.

According to the first embodiment, the operation for automatic focus and keystone correction is only carried out in response to the operation of the "AFK" key 15d on the main key/indicator 15. If the projector is moved another location, the operation for automatic focus and keystone correction is required. When the movement of the projector 10 is detected, the shift to the foregoing operation may be made without the operation of the "AFK" key 15d.

The foregoing operation will be described below as another operation of the first embodiment.

Figure 6:
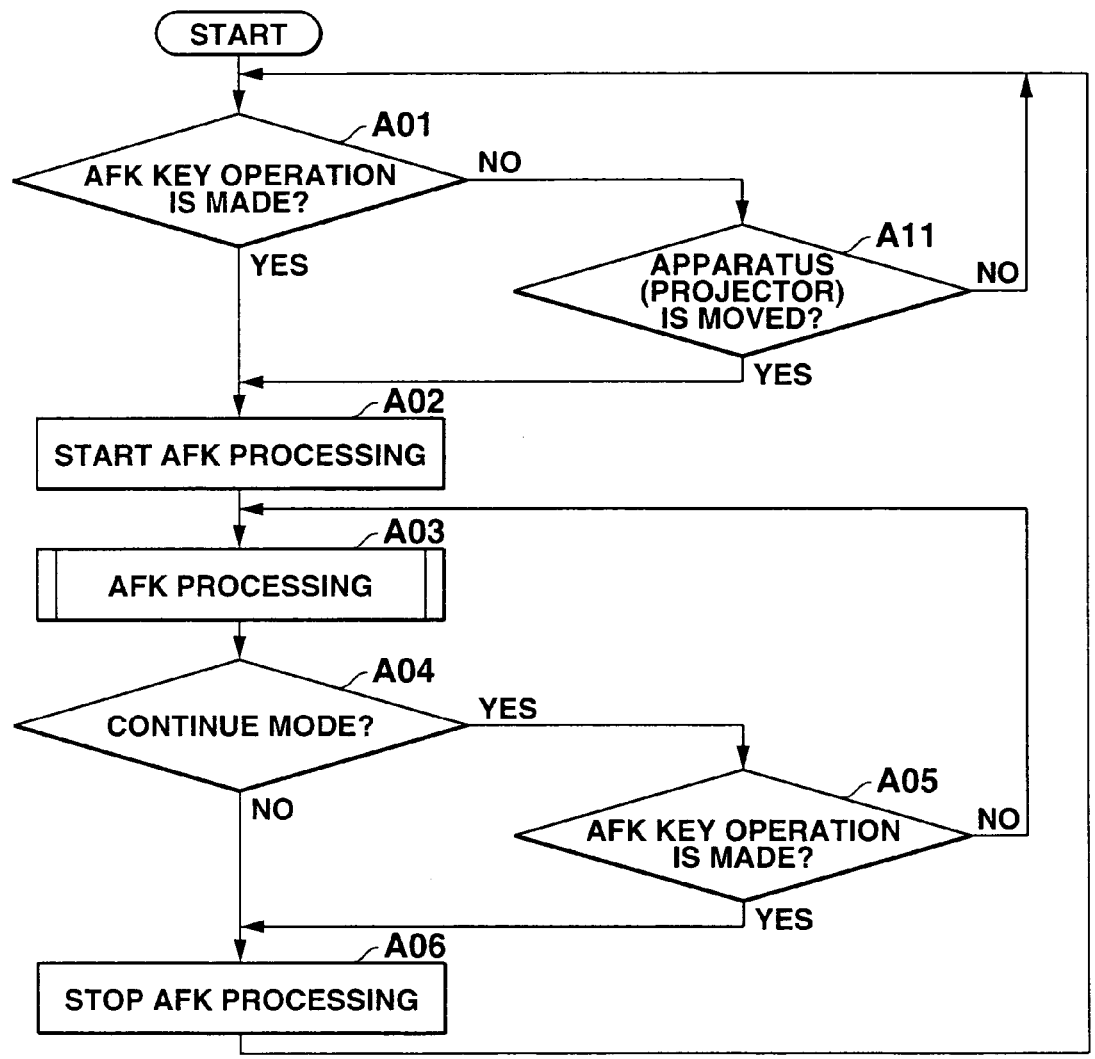
FIG. 6 is a flowchart to explain the procedure of another AFK key operation according to the first embodiment.

FIG. 6 shows another procedure of automatic focus and automatic keystone correction. The procedure is taken as an interrupt processing, which is forcedly carried out in the following cases. One is the case where the "AFK" key 15d is operated 15 in a power-on state. This another procedure is the case where a detection signal from the accelerometer 42 is inputted to the control section 39 with movement of the projector 10. In this case, the control section 39 controls the procedure based on operation programs stored in the internal ROM 392.

More specifically, it is determined whether or not the operation of the "AFK" key 15d is made (step A01). It is repeatedly determined whether or not the projector 10 is moved based on the detection signal from the accelerometer 42 (step A11). When it is obtained that either of the foregoing determinations gives "YES", the shift to the operation for automatic focus and keystone correction is made. The operation after the shift is the same as that described in FIG. 4; therefore, the explanation is omitted.

As described above, when the projector 10 is moved, the movement is detected, and instruction by the operation of the "AFK" key 15d can be simplified. By doing so, the focus position of projection image and the keystone distortion are automatically adjustable.

(Second Embodiment)

The second embodiment will be described below with reference to the accompanying drawings. Here, the present invention is applied to a projector.

Figure 2:
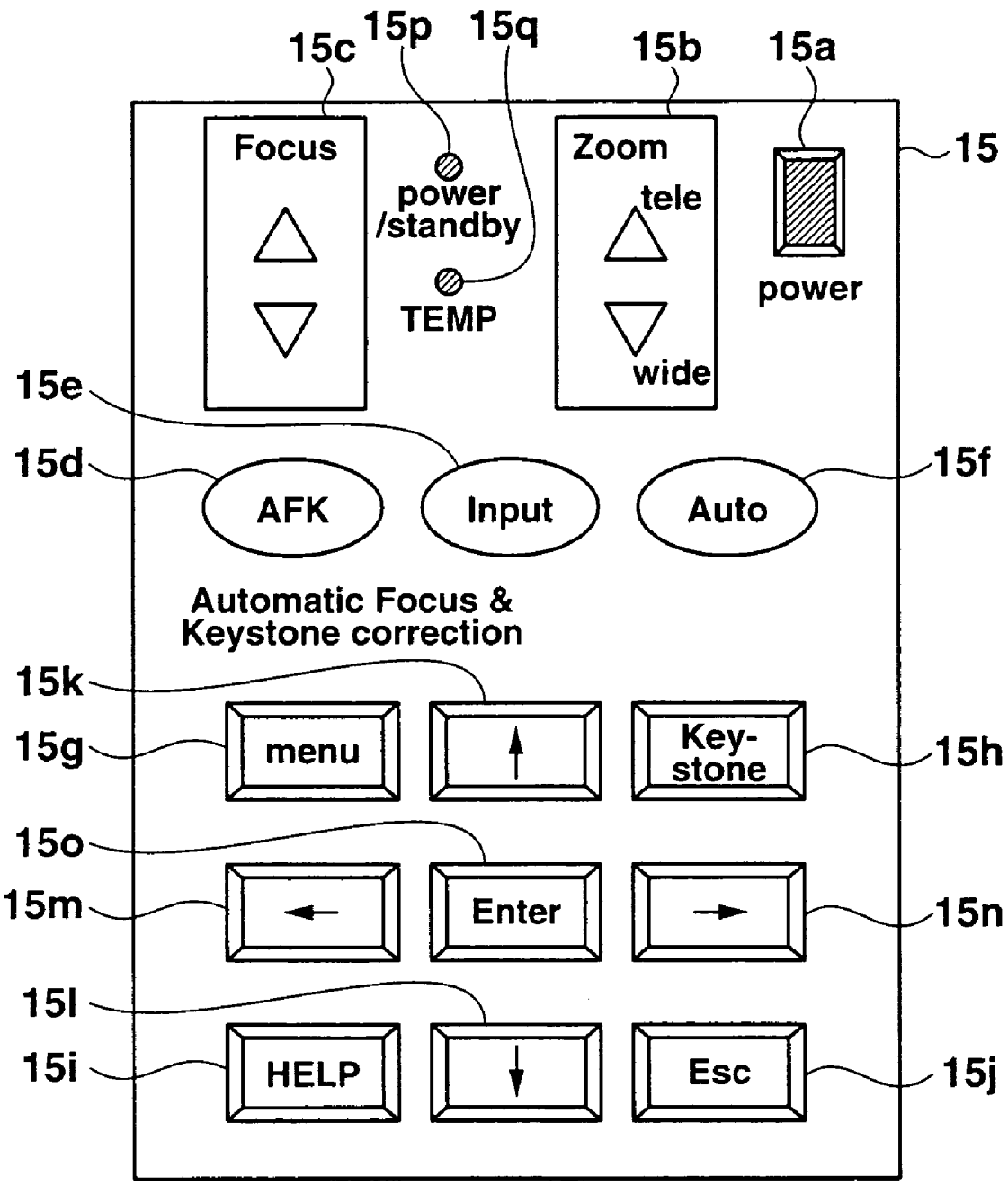
FIG. 2 is a view showing the arrangement of a main key/indicator of the projector shown in FIG. 1.

The projector 10 according to the second embodiment is basically the same as shown in FIG. 1 to FIG. 3. More specifically, the appearance of the projector 10 is the same as FIG. 1. The arrangement and configuration of the main key/indicator 15 provided on the casing 11 of the projector 10 is the same as FIG. 2. The functional configuration of electronic circuits is the same as FIG. 3. The same reference numerals are used to designate parts identical to above, and the illustration and explanation are omitted.

The operation of the second embodiment will be described below.

Figure 7:
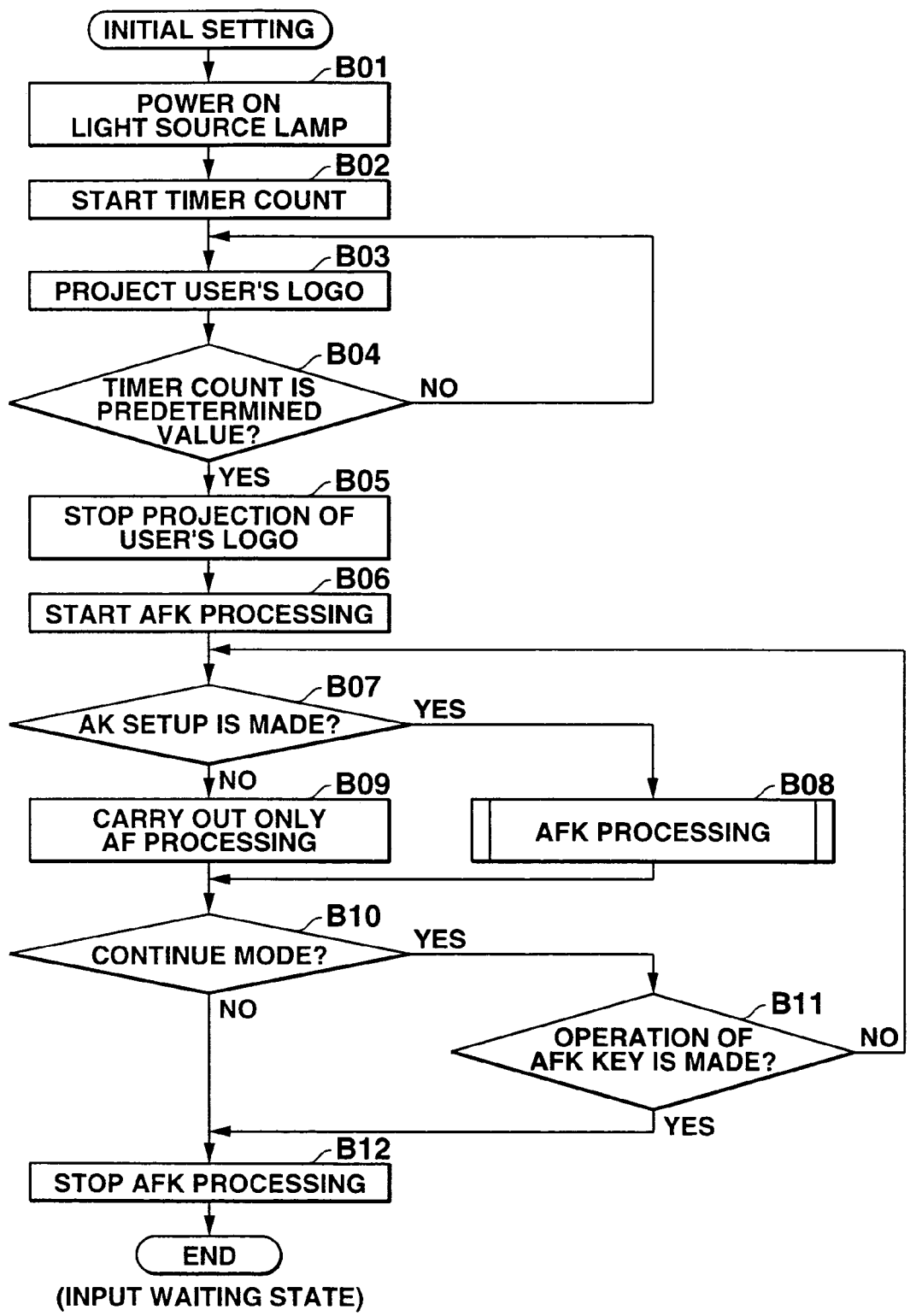
FIG. 7 is a flowchart to explain the initial setting procedure after power-on according to a second embodiment.

FIG. 7 is a flowchart showing the procedure of automatic focus and keystone correction. The procedure is taken as initial setting, which is carried out after a power-on state is given by operating the "power" key 15a on the main key/indicator 15. In this case, the control section 39 controls the procedure based on operation programs stored in the internal ROM 392.

In this case, the operation of the automatic focus is necessarily carried out. However, the user can arbitrarily presets whether or not the operation of the automatic keystone correction is made, by operating "menu" key 15g, "↑" (up) key 15k, "↓" (down) key 15l and "Enter" key 15o on the main key/indicator 15.

In the second embodiment, two modes described below are given. One is a one-shot mode for carrying out automatic focus only one-time while carrying out automatic keystone correction as the need arises. Another is a continue mode for continuously repeating the automatic focus while carrying out automatic keystone correction as the need arises until the second time operation is made after the first time operation of the "AFK" key 15d is made. In this case, the user arbitrarily presets either of the one-shot mode or continue mode by operating "menu" key 15g, "↑" (up) key 15k, "↓" (down) key 15l and "Enter" key 15o on the main key/indicator 15.

First, the light source lamp 37 is lighted on (step B01). Thereafter, an internal counter (not shown) of the control section 39 starts a count operation to measure time after the light source lamp 37 lights on (step B02).

The temperature of the light source lamp 37 does not sufficiently rise after the light source lamp 37 is turned on. Thus, the light emission (luminance) is not sufficient as well as the temperature.

For this reason, image data is read for the time being. The image data is arbitrary logo image (or guide message image such as character stream "Please wait a moment" in a default state of apparatus) stored previously in the image storage section 40 by the user. Then, the special optical modulator element 36 of the projection system is driven. The optical image is projected and displayed on the screen (not shown) of the projection object by the projection lens 12 (step B03). On the other hand, it is determined whether or not the count value of the internal counter of the control section 39 becomes a predetermined value, for example, value equivalent to time "five minutes" (step B04). The procedure described above is repeatedly carried out, and thereby, it is waiting until the foregoing time elapses.

When it is determined that the count value of the internal counter of the control section 39 reaches the predetermined value, the projection and display of the logo image is stopped (step B05). The state of starting automatic focus and automatic keystone correction as the need arises is set (step B06).

First, it is determined whether or not setup for carrying out automatic keystone correction (AK) is made (step B07).

After it is confirmed that the setup is made, first-time automatic focus and automatic keystone correction are carried out (step B08).

FIG. 5A is a sub-routine showing the procedure of the automatic focus and keystone correction. First, a horizontal chart image HC shown in FIG. 5B is projected and displayed by the projection system including the projection lens 12 based on image data stored in the image storage section 40 (step S01).

The horizontal chart image HC is composed of three point images horizontally arrayed at equal intervals.

In a state that the horizontal chart image HC is projected and displayed, the phase difference sensor 132 and the distance measuring section 43 measure a distance "LL" to projection image position of the point situated on the opposite left side of the projector 10 (step S02).

Thereafter, a distance "LC" to projection image position of the center point and a distance "LR" projection image position of the point situated on the right side are successively measured in the same manner as above (step S03, step S04).

Based on individual distances relevant to three points thus obtained, a horizontal angle "θh" on a screen projection plane for projecting image to the projection optical axis is calculated (step S05).

In place of the horizontal chart image HC, a vertical chart image VC shown in FIG. 5B is projected and displayed based on image data stored in the image storage section 40 (step S06).

The vertical chart image VC is composed of three point images vertically arrayed at equal intervals. In this case, the center point of the vertical chart image VC is positioned to overlap with the center point of the horizontal chart image HC.

In a state that the vertical chart image VC is projected and displayed, the phase difference sensor 131 and the distance measuring section 43 measure a distance "LU" to projection image position of the point situated on the upper side (step S07).

Thereafter, a distance "LD" to projection image position of the point situated on the lower side is measured in the same manner as above (step S08). In this case, a distance "LC" to projection image position of the center point is the same as the horizontal chart image HC. The distance is already measured in step S02; therefore, the measured value is employed here while the measuring process is omitted.

Based on individual distances relevant to three points of the vertical chart image VC, a vertical angle "θv" on a screen projection plane for projecting image to the projection optical axis is calculated (step S09).

The distance "LC" to projection image position of the center point measured in step S02 is intactly required as a typical distance value of projection image (step S10). The projection lens 12 is driven by the lens motor 38 so that it is moved to a new focus position corresponding to the distance value described above.

Thereafter, an angle required for keystone correction is calculated based on horizontal and vertical angles "θh" and "θv" on the screen projection plane projecting image obtained in steps S05 and S09 (step S11). By doing so, direction and angle where the screen projection plane is positioned can be seen. Further, it is possible to obtain a rectangle having a proper aspect ratio identical to the image signal including projection image data. The display encoder 33 is set to correct a ratio of top and bottom sides and a ratio of right and left sides in image data stored in the video RAM 34. Then, the sub-routine shown in FIG. 5A temporarily ends, and thereafter, the procedure returns to the AFK processing of FIG. 7.

If it is determined in step B07 that the setup for the automatic keystone correction is not made, only automatic focus is carried out. In a state that the horizontal chart image HC or vertical chart image VC shown in FIG. 5B is projected and displayed, the phase difference sensor and the distance measuring section 43 measure a distance "LC" to projection image position of the center point. Then, the lens motor 38 drives the projection lens 12 so that the projection lens 12 is moved to a focus position corresponding to the newly measured distance value (step B09).

Automatic focus and keystone correction are carried out in step B08, or it is determined whether or not the continue mode is set after only automatic focus is carried out in step B09 (step B10).

If it is determined that the continue mode is set, it is confirmed that the second-time operation of the "AFK" key 15d is not made (step B11). Thereafter, the procedure returns to step B08, and then, automatic focus is again carried out while automatic keystone correction is carried out as the need arises.

In the foregoing state that the continue mode is set, the procedures of steps B07 to B11 are repeatedly carried out until the second-time operation of the "AFK" key 15d is made.

If it is determined in step B11 that the second-time operation of the "AFK" key 15d is made, and if it is determined in step B10 that one-shot mode is set, and not continue mode, automatic focus and keystone correction of the interrupt processing are stopped (step B12). The initial setting ends, and the control section shifts to an input waiting state to make projection corresponding to an input signal.

In the initial setting after power-on, instruction by the operation of the "AFK" key 15d described in the second embodiment is simplified. Therefore, the focus position of projection image and the keystone distortion are automatically adjustable.

In addition, the selection whether or not keystone correction is made is previously set. Therefore, only focus position is more quickly carried out in the following cases. One is the case of having no need to carry out keystone correction. Another is the case of preventing the projection image from being reduced by keystone correction even if keystone distortion occurs to some degree, and visually confirming display contents.

When a predetermined time elapses after power-on, the operation of the light source lamp 37 of the projection system becomes stable state, in particular. Thereafter, automatic focus is carried out while automatic keystone correction is carried out as the need arises.

In the second embodiment, when a predetermined time elapses after power-on, automatic focus is carried out while automatic keystone correction is carried out as the need arises, as described above. However, the present invention is not limited to the foregoing second embodiment. In this case, a luminance sensor (luminance sensing section) 441 may be used in place of time, that is, temperature of the display drive section 35 detected by the temperature sensor 44 located for the light source lamp 37 or the temperature sensor 44 (not described in FIG. 3). The luminance sensor 441 detects the luminance (emission) of the light source lamp 37. By doing so, when the detected temperature or luminance of the light source lamp 37 exceeds a predetermined value, automatic focus is carried out while automatic keystone correction is carried out as the need arises. Thus, after the light source lamp 37 is stably operated, automatic focus is carried out while automatic keystone correction is carried out as the need arises. As a result, automatic focus and automatic keystone correction are accurately carried out.

In a state that the operation is not still stable immediately after power-on, first-time automatic focus is carried out first of all, and the distance range to the projection object screen is roughly grasped. In particular, when the operation of the light source lamp 37 of the projection system after a predetermined time elapses, the search range of automatic focus is narrowed. Thereafter, second-time automatic focus is carried out while automatic keystone correction is carried out as the need arises. By doing so, time required for the operation is largely shortened. In addition, automatic focus is more accurately carried out.

In the first and second embodiments, the phase difference sensors 132 and 131 successively measure distances LC, LL, LR, LU and LD to points on horizontal and vertical chart images HC and VC as projection image shown in FIG. 5B. Means for measuring the distance is not limited to the phase difference sensors. In this case, several active type sensors may be provided with respect to some points. The active type sensor generates (oscillates) an infrared ray, ultrasonic wave or laser beam, and measures the distance by receiving the reflection wave. The active type sensors may be configured so that the oscillation angle is variable.

In place of the sensor for measuring the distance, an imaging section may be used. The imaging section has an imaging device such as CCD and a contrast type automatic focus function. A distance value to each point from focus lens position is calculated when several point positions are automatically focused.

Besides, the present invention is not limited to the foregoing embodiments; various modifications are possible within the scope without diverging from the subject matter of the invention.

The foregoing embodiments include various stage inventions, and disclosed constituent requirements are properly combined, thereby extracting various inventions. For example, even if some constituent requirements may be deleted from all constituent requirements disclosed in the embodiments, it is possible to solve at least one of problems described in the column of "Problem that the invention is to solve". If at least one of the effects described in the column of "Effect of the Invention", configuration in which constituent requirements are deleted is extracted as invention.

What is claimed is:

1. A projection apparatus comprising:
   a projection section for projecting an image corresponding to an input image signal;
   a distance measuring section for measuring respective distances to positions on an image projection plane made by the projection section;
   a keystone correction section for performing keystone correction on an image projected by the projection section so that the projected image is formed into a rectangular shape having a proper aspect ratio, based on the distances obtained by the distance measuring section;
   a focus control section for controlling a focus position of the image projected by the projection section based on at least one of the distances obtained by the distance measuring section;
   a control section for issuing an instruction to carry out processings by the distance measuring section, the keystone correction section and the focus control section; and
   a temperature sensing section for sensing a temperature of a light source lamp of the projection section;
   wherein the control section automatically issues the instruction when the temperature sensing section detects that the temperature of the lamp is more than a predetermined value after vower of the apparatus is turned on.

2. The apparatus according to claim 1, wherein the control section includes a single key for instructing to carry out the processing by at least one of the distance measuring section, the keystone correction section and the focus control section.

3. The apparatus according to claim 1, further comprising:
   a setup section for setting whether or not the keystone correction by the keystone correction section is is to be carried out when the instruction is issued by the control section.

4. The apparatus according to claim 1, further comprising:
   a movement detecting section for detecting movement of the apparatus,
   wherein the control section automatically issues the instruction when the movement detecting section detects the movement of the apparatus.

5. The apparatus according to claim 1, further comprising:
   a select section for selecting: (i) a one-shot mode for carrying out the processings by the distance measuring section, the keystone correction section and the focus section only one time in accordance with the instruction issued by the control section, and (ii) a continue mode for continuously carrying out the processings by the distance measuring section, the keystone correction section and the focus section until a second instruction is made after the first instruction by the control section.

6. The apparatus according to claim 1, wherein the distance measuring section measures the distances with respect to positions on a chart image projected for distance measuring.

7. The apparatus according to claim 6, wherein the chart image comprises a horizontal chart image for measuring distances with respect to positions in a horizontal direction, and a vertical chart image for measuring distances with respect to positions in a vertical direction.

8. The apparatus according to claim 1, wherein the instruction is issued a first time by the control section after the apparatus powers on, and a second time instruction is issued by the control section when a predetermined time elapses after the focus control section acquires a focus position.

9. A projection apparatus comprising
   a projection section for projecting an image corresponding to an input image signal;
   a distance measuring section for measuring respective distances to positions on an image projection plane made by the projection section;
   a keystone correction section for performing keystone correction on an image projected by the projection section so that the projected image is formed into a rectangular shape having a proper aspect ratio, based on the distances obtained by the distance measuring section;

a focus control section for controlling a focus position of the image projected by the projection section based on at least one of the distances obtained by the distance measuring section; and a control section for issuing an instruction to carry out processings by the distance measuring section, the keystone correction section and the focus control section;

wherein the instruction is issued by the control section when it is determined that a predetermined period of time has elapsed after power of the apparatus is turned on.

10. A projection apparatus comprising:

a projection section for projecting an image corresponding to an input image signal;

a distance measuring section for measuring respective distances to positions on an image projection plane made by the projection section;

a keystone correction section for performing keystone correction on an image projected by the projection section so that the projected image is formed into a rectangular shape having a proper aspect ratio, based on the distances obtained by the distance measuring section;

a focus control section for controlling a focus position of the image projected by the projection section based on at least one of the distances obtained by the distance measuring section;

a control section for issuing an instruction to carry out processings by the distance measuring section, the keystone correction section and the focus control section;

a luminance sensing section for sensing a luminance of a light source lamp of the projection section;

wherein the instruction is issued by the control section when the luminance sensing section detects that the luminance of the lamp is more than a predetermined value after a power of the apparatus is turned on.

* * * * *